United States Patent
Javaudin et al.

(10) Patent No.: US 7,961,805 B2
(45) Date of Patent: Jun. 14, 2011

(54) METHOD FOR THE CODING OF AN OFDM/OQAM SIGNAL USING SYMBOLS WITH COMPLEX VALUES, AND CORRESPONDING SIGNAL, DEVICES AND COMPUTER PROGRAMS

(75) Inventors: Jean-Philippe Javaudin, Rennes (FR); Pierre-Jean Bouvet, Caen (FR)

(73) Assignee: France Telecom, Paris (FR)

( * ) Notice: Subject to any disclaimer, the term of this patent is extended or adjusted under 35 U.S.C. 154(b) by 697 days.

(21) Appl. No.: 11/913,286

(22) PCT Filed: Mar. 31, 2006

(86) PCT No.: PCT/EP2006/061241
§ 371 (c)(1),
(2), (4) Date: Mar. 7, 2008

(87) PCT Pub. No.: WO2006/117269
PCT Pub. Date: Nov. 9, 2006

(65) Prior Publication Data
US 2008/0260061 A1 Oct. 23, 2008

(30) Foreign Application Priority Data
May 3, 2005 (FR) ..................................... 05 04517

(51) Int. Cl.
*H04L 5/12* (2006.01)
*H04L 27/36* (2006.01)
(52) U.S. Cl. ........................................ 375/261; 375/298
(58) Field of Classification Search .......... 375/261–262, 375/267, 285, 295, 298, 316, 340, 349; 370/206, 370/208, 210, 465
See application file for complete search history.

(56) References Cited

U.S. PATENT DOCUMENTS

| | | | | |
|---|---|---|---|---|
| 6,091,932 A | * | 7/2000 | Langlais | 725/111 |
| 7,099,396 B1 | * | 8/2006 | Combelles et al. | 375/260 |

(Continued)

FOREIGN PATENT DOCUMENTS
WO    WO 0225884    3/2002

OTHER PUBLICATIONS

Hartmann M. M. et al., Institute of Electrical and Electronic engineers—"Theory and Design of Multipulse Multicarrier Systems for Wireless Communications", Conference record of the 37$^{th}$ Asilomar conference on signals, systems & computers, Pacific Groove, CA, Nov. 9-12, 2003, Asilomar conference on signals, systems & computers, New York, NY : IEEE US, vol. 1 or 2, Conf. 37, Nov. 9, 2003, pp. 492-496.

French Search Report for Application No. FR 05/04517, Dec. 9, 2005.

(Continued)

*Primary Examiner* — Khanh C Tran
(74) *Attorney, Agent, or Firm* — David D. Brush; Westman, Champlin & Kelly, P.A.

(57) ABSTRACT

A method and apparatus are provided for coding an OFDM/OQAM-type multi-carrier signal formed by a temporal succession of symbols comprising a set of data elements. Each of the data elements modulates a carrier frequency of the signal. Each of the data elements is formed by adding two real values in quadrature, which each correspond to a binary word of a source signal, which is modulated using a pre-determined modulation constellation, such as to transmit information over a real channel and an imaginary channel of the OFDM/OQAM symbols.

14 Claims, 2 Drawing Sheets

U.S. PATENT DOCUMENTS

| | | | |
|---|---|---|---|
| 7,436,881 B2* | 10/2008 | Nedic et al. | 375/233 |
| 2002/0126741 A1* | 9/2002 | Baum et al. | 375/144 |
| 2003/0063680 A1 | 4/2003 | Nedic et al. | |
| 2004/0141559 A1* | 7/2004 | Tewfik et al. | 375/248 |

OTHER PUBLICATIONS

Written Opinion of the International Searching Authority for Application No. PCT/EP2006/061241, Mar. 31, 2006.

* cited by examiner

METHOD FOR THE CODING OF AN OFDM/OQAM SIGNAL USING SYMBOLS WITH COMPLEX VALUES, AND CORRESPONDING SIGNAL, DEVICES AND COMPUTER PROGRAMS

CROSS-REFERENCE TO RELATED APPLICATION

This Application is a Section 371 National Stage Application of International Application No. PCT/EP2006/061241, filed Mar. 31, 2006 and published as WO 2006/117269 A1 on Nov. 9, 2006, not in English.

FIELD OF THE DISCLOSURE

The field of the disclosure is that of the transmission and broadcasting of digital information. The disclosure relates especially but not exclusively to the transmission and broadcasting of digital information with high spectral efficiency on a limited frequency band, for example in a radiomobile environment.

The disclosure pertains more specifically to the techniques of transmission and broadcasting of information by OFDM (Orthogonal Frequency Division Multiplexing) type multi-carrier signals.

BACKGROUND

To date, there are several types of OFDM type multi-carrier modulations.

Among these types, the most classic modulation technique comprises a particularly simple equalization system based on the insertion of a guard interval. This guard interval, also called a cyclical prefix, provides for efficient performance in the face of echoes, at the cost of a loss of spectral efficiency.

During this guard interval, no payload information is transmitted. This is to ensure that all the information received comes from a same symbol. Thus, the various phenomena of echoes due to ISI (inter-symbol interference) and to the Doppler effect are efficiently curbed.

OFDM/OQAM ("Orthogonal Frequency Division Multiplexing/Offset Quadrature Amplitude Modulation") is an alternative to this classic OFDM modulation and has been designed to prevent this loss of spectral efficiency caused by the introduction of a guard interval.

More specifically, OFDM/OQAM does not necessitate the presence of a guard interval or a cyclical prefix because of a judicious choice of the prototype function modulating each of the carriers of the signal. This function must be well localized in the time-frequency space.

It may be recalled indeed that the set of carriers of a multi-carrier modulation forms a multiplex and that each of the carriers of this multiplex is shaped by means of a same prototype function, written as g(t), which characterizes the multi-carrier modulation. With $v_0$ denoting the spacing between two adjacent carriers of the multiplex and $\tau_0$ denoting the temporal spacing between two multi-carrier symbols sent, the signal sent, at each instant $n\tau_0$, on the $m^{th}$ subband with $v_m$, the center frequency is $\alpha_{m,n} e^{i\phi_{m,n}} e^{2i\pi v_m t} g(t-n\tau_0)$, where the $\alpha_{m,n}$ values represent the digital data to be transmitted. The expression of the signal sent in baseband (centered on the frequency $Mv_0$) is then:

$$s(t) = \sum_n \sum_{m=0}^{2M-1} a_{m,n} e^{i\varphi_{m,n}} e^{2i\pi m v_0 t} g(t - n\tau_0) \quad (1)$$

It will be noted here that, for the sake of clarity, we envisage the case of a signal having an even number of frequency subbands. The signal can of course be written more generally in the form:

$$s(t) = \sum_n \sum_{m=0}^{M-1} a_{m,n} e^{i\varphi_{m,n}} e^{2i\pi m v_0 t} g(t - n\tau_0) \quad (2)$$

It will indeed be recalled that, according to a classic technique, digital data $\alpha_{m,n}$ of zero value are introduced at the edges of the spectrum, thus modifying the number of terms that effectively play a role in the above sum, and enabling for example the operation to be reduced to an even number of carriers.

The functions $g_{m,n}(t) = e^{i\phi_{m,n}} e^{2i\pi m v_0 t} g(t-n\tau_0)$ are called the "time-frequency" translates of g(t). To retrieve the information transmitted by each of the carriers, it is necessary to choose g(t) and the phases $\phi_{m,n}$ so that the above "time-frequency" translates are separable. A sufficient condition for verifying this property of separability is that the translates should be orthogonal in the sense of a scalar product defined on the set of finite energy functions (which is a finite Hilbert space in the mathematical sense).

The space of the finite energy functions accepts the following two scalar products:

the complex scalar product $$\langle x | y \rangle = \int_R x(t) y^*(t) dt$$

the real scalar product $$\langle x | y \rangle_R = \mathcal{R}e \int_R x(t) y^*(t) dt$$

Thus two types of multi-carrier modulation are defined:
a complex type multi-carrier modulation for which the chosen function g(t) guarantees orthogonality, in the complex sense, of its translates. This is the case, for example, with classic OFDM modulation, also called OFDM/QAM ("Orthogonal Frequency Division Multiplexing/Quadrature Amplitude Modulation"). For such a modulation, $\phi_{m,n}=0$ and $\alpha_{m,n}$ are complex data.
a real type multi-carrier modulation for which the chosen function g(t) guarantees orthogonality, in the real sense, of its translates. This is the case, for example, with OFDM/OQAM modulations. For a modulation of this type, $\phi_{m,n}=(\pi/2)*(m+n)$ and the pieces of data $\alpha_{m,n}$ are real data.

Thus, a transmitted OFDM/OQAM signal can be written as follows:

$$s(t) = \sum_n \sum_{m=0}^{M-1} a_{m,n} \underbrace{i^{m+n} e^{2i\pi m v_0 t} g(t - n\tau_0)}_{g_{m,n}(t)} \quad (3)$$

where $\alpha_{m,n}$ is the real symbol sent on the $m^{th}$ subcarrier at the $n^{th}$ symbol time, M is the number of carriers, $v_0$ is the inter-carrier spacing, $\tau_0$ represents the duration of an OFDM/OQAM symbol, and g is the prototype function.

This prototype function g modulating each OFDM/OQAM carrier must be very well localized in the time domain to limit inter-symbol interference. Furthermore, it must be chosen so as to be very well localized in the frequency domain, to limit inter-carrier interference (due to the Doppler effect, phase noise etc. . . . ). This function must also guarantee orthogonality between sub-carriers.

The mathematical functions that show these characteristics exist but the best localized among them ensure orthogonality solely on real values. For this reason, the symbols transmitted by OFDM/OQAM modulation must be with real values so that they can be retrieved without interference at reception.

Orthogonality between the time frequency translates of the prototype function is guaranteed if:

$$\text{Re}\left(\int_{\mathbb{R}} g_{m,n}(t) \cdot g^*_{m',n'}(t) dt\right) = \delta_{m,m'} \delta_{n,n'} \quad (4)$$

One of the prototype functions verifying these conditions is the IOTA prototype function described, for example, in the patent application No. FR 2 733 869, which has the characteristics of being identical to its Fourier transform.

Figure 1:
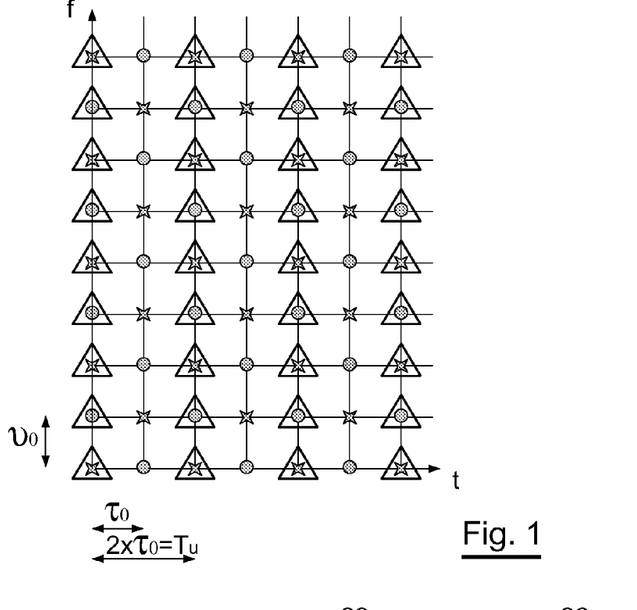
FIG. 1, already described with reference to the prior art, is a time-frequency representation of the symbols with complex values transmitted according to classic OFDM modulation and of the real value symbols transmitted according to a prior art OFDM/OQAM modulation.

FIG. 1 is a time-frequency representation of the symbols with real values transmitted by OFDM/OQAM modulation and of the symbols with complex values transmitted by classic OFDM modulation without any guard interval.

In this figure, the triangles represent the OFDM/QAM symbols with complex values. The circles and stars for their part represent OFDM/OQAM symbols with real values. For example, the circles correspond to the real part and the stars to the imaginary part of a complex symbol coming from a QAM constellation which it is sought to transmit using a OFDM/OQAM modulation.

Indeed, for a classic OFDM modulation of a complex type, the real and imaginary parts of a complex value coming from the QAM constellation are transmitted simultaneously once at every symbol time $T_u$; in the case of a real type OFDM/Offset QAM modulation on the contrary, the real and imaginary parts are transmitted with a time lag of half a symbol time ($T_u/2$).

It is seen in this FIG. 1 that the spectral efficiency of OFDM/OQAM is identical to that of the classic OFDM without guard interval. Indeed, for a same inter-carrier spacing $v_0$, we transmit the following:
  in OFDM/OQAM, one real value per carrier at every time interval $\tau_0$;
  in classic OFDM without guard interval, a complex value (i.e. two real values) every $2*\tau_0=T_u$.

The quantity of information transmitted by these two modulations is therefore identical. However, the need to introduce a guard interval with a duration $T_g$ in classic OFDM has the effect of reducing the spectral efficiency of classic OFDM as compared with OFDM/OQAM, which proves to be $(T_g+2\tau_0)/2\tau_0$ more efficient.

One drawback of these prior art techniques, whether classic OFDM modulation guard interval or OFDM/OQAM modulation, is that to increase the spectral efficiency it is necessary to use QAM modulations whose constellations have a large number of states. Now, such QAM modulations with large numbers of states are highly sensitive to noise and to errors of estimation of the propagation channel.

Indeed, as indicated here above, the spectral efficiency of the classic OFDM modulation is limited by the need to introduce a guard interval designed to reduce inter-symbol interference during which no payload information can be transmitted. If complex symbols can be transmitted by this OFDM modulation, it is nonetheless true that the associated symbol time is twice as long as it is for an OFDM/OQAM modulation.

OFDM/OQAM modulation for its part, although having a higher spectral efficiency then classic OFDM modulation, is limited by the constraint of orthogonality of the carriers in the real domain, which dictates the choice of modulation filters for the symbols that are well localized in the time-frequency space and which therefore enables the transmission of only symbols with real values.

SUMMARY

An illustrative embodiment of the invention relates to a method of encoding an OFDM/OQAM-type multi-carrier signal formed by a temporal succession of symbols comprising a set of data elements, each of said data elements modulating a carrier frequency of said signal.

According to an embodiment of the invention, each of said data elements is formed by a summing of two real values in quadrature, each corresponding to a binary word of a source signal, modulated according to a predetermined modulation constellation, so as to transmit information on a real path and on an imaginary path of said OFDM/OQAM symbols.

Thus, an embodiment of the invention relies on an absolutely novel and inventive approach to OFDM/OQAM-type multi-carrier modulation. Indeed, while the prior art techniques all required that the symbols transmitted in an OFDM/OQAM signal should have real values in order to guarantee orthogonality between the carriers in the real domain, the technique of an embodiment of the invention consists of the transmission of the symbols with complex values in OFDM/OQAM modulation. Thus, referring to FIG. 1, the technique of an embodiment of the invention enables the transmission, by OFDM/OQAM modulation, of a complex value every $\tau_0$, thus considerably increasing the spectral efficiency of the modulation as compared with classic OFDM modulations, with or without guard interval, and prior art OFDM/OQAM modulations.

It will be noted that the term "symbols with real values" is understood here and throughout this document to mean symbols conveying information in only one dimension as opposed to symbols with complex values of the OFDM/OQAM signal of an embodiment of the present invention which uses two paths in quadrature. The unique dimension of the prior art symbols with real values corresponds to the path called "real path" of the OFDM/OQAM of an embodiment of the invention.

The technique of an embodiment of the invention runs counter to the technical prejudice of those skilled in the art who have always deemed such transmission of symbols with complex values by OFDM/OQAM to be not possible owing to intrinsic interference generated between the real and imaginary parts of the symbols that would be thus sent, even when there was no transmission canal.

The inventors of the present encoding technique have nonetheless chosen to accept an increase of this kind in the inter-symbol interference, linked to the transmission of data on the imaginary parts of the OFDM/OQAM symbols, in order to also increase the number of symbols transmitted.

Thus, the OFDM/OQAM encoding technique of an embodiment of the invention is used to improve the transmission rate as compared with the prior OFDM/OQAM modulations, in doubling the number of symbols sent on the transmission channel (the effective bit rate transmitted is however not doubled owing to the increase in the binary error rate linked to the appearance of intrinsic inter-symbol interference).

The encoding technique of an embodiment of the invention can also enable the improvement, at transmission rates identical to those of prior art OFDM/OQAM modulations, of the binary error rate in using lower encoding efficiency and taking greater advantage of the diversity of the canal.

Advantageously, said summing is a weighted summing so that one of said paths presents a higher power level. It is thus possible to adjust the power of one of the sources so as to take account, for example, of a difference in quality of the transmission channels associated with two users one of whom receives on the real path and the other on the imaginary path.

In a first variant of an embodiment of the invention, said source signals are correlated. It is thus possible to improve the quality of reception of the payload information that they convey.

For example, one of said source signals conveys redundancy information related to the payload information conveyed by the other source signal.

It may also be envisaged that said source signals are identical but undergo different channel encoding and/or interlacing on each of said paths.

In a second variant of an embodiment of the invention, said source signals are signals that are independent of each other.

It is thus possible, in the same OFDM/OQAM signal, to transmit different pieces of payload information, intended for example for two distinct users.

According to an advantageous characteristic of an embodiment of the invention, the information transmitted on each of said paths comprises, firstly, source information and, secondly, redundancy information computed from said source information. A channel encoding of this kind furthermore makes it possible to increase robustness and improve the quality of the retrieval of source information at reception.

In an advantageous embodiment of the invention, said data elements are shaped by the IOTA prototype function which has the particular feature of being identical to its Fourier transform, and is particularly well localized in the time-frequency space. Any other prototype function can also be used in the context of an embodiment of the invention.

Preferably, a different protection level is assigned to the information transmitted on each of said paths.

In particular, this level of protection may depend on a channel encoding and/or an order of said predetermined modulation constellation. It is thus possible for example to apply two distinct error correction codes to each of the paths, these codes being different in terms of throughput rate and/or structure (for example a convoluted code is used on one path and a turbo-code on the other path).

An embodiment of the invention also relates to an OFDM/OQAM type multi-carrier signal formed by a temporal succession of symbols constituted by a set of data elements, each of said data elements modulating a carrier frequency of said signal. Each of said data elements is formed by summing of two real values in quadrature, each corresponding to a binary word of a source signal, modulated according to a predetermined modulation constellation, so as to transmit information on a real path and on an imaginary path of said OFDM/OQAM symbols.

An embodiment of the invention also relates to a device for the encoding of an OFDM/OQAM-type multi-carrier signal formed by a temporal succession of symbols comprising a set of data elements, each of said data elements modulating a carrier frequency of said signal. An encoding device of this kind comprises means for forming each of said data elements by summing two real values in quadrature, each corresponding to a binary word of a source signal, modulated according to a predetermined modulation constellation, so as to transmit information on a real path and on an imaginary path of said OFDM/OQAM symbols.

An embodiment of the invention also pertains to a method for the decoding of a received OFDM/OQAM type multi-carrier signal, said signal being formed by a temporal succession of symbols constituted by a set of data elements, each of said data elements modulating a carrier frequency of said signal.

With each of said data elements being formed, at encoding, by summing two real values in quadrature, each corresponding to a binary word of a source signal, modulated according to a predetermined modulation constellation, so as to transmit information on a real path and on an imaginary path of said OFDM/OQAM symbols, said decoding method implements:
　a step of selection, in said received signal, of information associated with a first path from amongst said real path and imaginary path;
　a step of selective processing of the information associated with said first path enabling delivery of an estimation of the corresponding source signal;
and, at least at certain instants,
　a step of selection, in said received signal, of information associated with a second path from amongst said real path and imaginary path;
　a step of selective processing of the information associated with said second path enabling delivery of an estimation of the corresponding source signal.

An embodiment of the invention also relates to a computer program product downloadable from a communications network and/or stored in a computer-readable medium and/or executable by a microprocessor, comprising program code instructions for the implementation of the method for encoding a multi-carrier signal as described here above.

It also pertains to a computer program product downloadable from a communications network and/or stored on a computer-readable medium and/or executable by a microprocessor, comprising program code instructions for the implementation of the steps of the method for decoding a multi-carrier signal as described here above.

Finally, an embodiment of the invention relates to a device for decoding a received OFDM/OQAM type multi-carrier signal, said signal being formed by a temporal succession of symbols constituted by a set of data elements, each of said data elements modulating a carrier frequency of said signal and being formed, at encoding, by a summing of two real values in quadrature, each corresponding to a binary word of a source signal, modulated according to a predetermined modulation constellation, so as to transmit information on a real path and on an imaginary path of said OFDM/OQAM symbols. Such a decoding device comprises:

means of selection, in said received signal, of information associated with a first path from amongst said real path and imaginary path;

means of selective processing of the information associated with said first path enabling delivery of an estimation of the corresponding source signal;

means of selection, in said received signal, of information associated with a second path from amongst said real path and imaginary path;

means of selective processing of the information associated with said second path enabling delivery of an estimation of the corresponding source signal.

BRIEF DESCRIPTION OF THE DRAWINGS

Other features and advantages shall appear more clearly from the following description of a preferred embodiment, given by way of a simple, illustrative and non-exhaustive example, and from the appended drawings, of which.

DETAILED DESCRIPTION OF ILLUSTRATIVE EMBODIMENTS

The general principle of an embodiment of the invention consists of the addition, to the real symbols transmitted in OFDM/OQAM type modulation, of additional pieces of information on their imaginary part in order to make complex symbols of them. Contrary to the technical prejudice of those skilled in the art who have always been of the view that the transmission of symbols with complex values in OFDM/OQAM mode was not possible because of intrinsic inter-symbol interference which would then be generated at transmission, an embodiment of the invention consists of the transmission of information on both the real path and the imaginary path of OFDM/OQAM symbols.

In the context of a OFDM/OQAM modulation with symbols of complex values, the imaginary part of the projection of the received signal on the basis of the translates of the prototype function is not zero. There therefore appears a disturbing imaginary term which gets added to the demodulated real signal and which needs to be corrected before the estimation of the channel is performed.

The complex projection of the signal, even if it is perfectly transmitted, is indeed adversely affected by an intrinsic ISI (inter-symbol interference) related to the use at transmission of symbols with complex values. The term "ISI" is understood to mean interference between temporal symbols and/or between carriers.

The encoding technique of an embodiment of the invention disregards this disturbing intrinsic interference and relies on the transmission of payload information on the imaginary part of OFDM/OQAM symbols which are therefore symbols with complex values.

Figure 2:
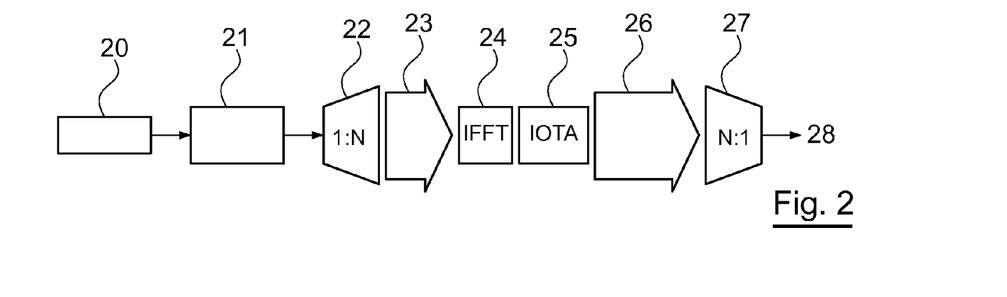
FIG. 2 is a block diagram of the transmission sequence of a prior art OFDM/OQAM type multi-carrier signal.
Figure 3:
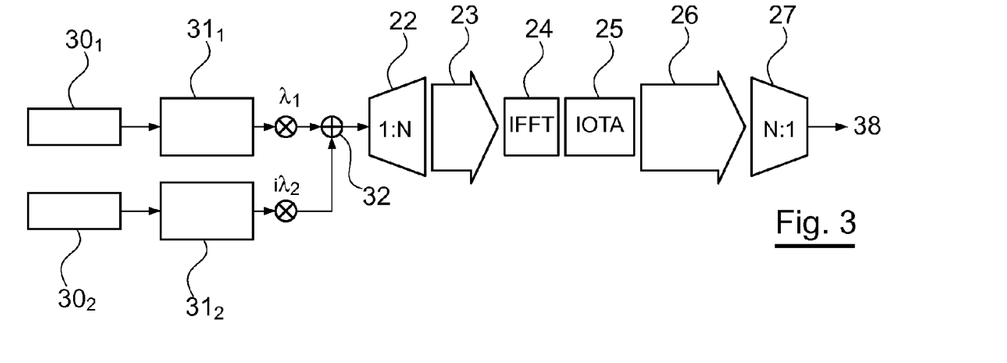
FIG. 3 is a block diagram of the transmission sequence of an OFDM/OQAM type multi-carrier signal according to an embodiment of the invention.

Referring to FIGS. 2 and 3, we now present an embodiment of an encoding technique of the invention of this kind, in the form of a comparison of the sequences of transmission of OFDM/OQAM signals in the prior art and in an embodiment of the invention.

Throughout the rest of this document, a description is given of a particular embodiment of the invention in which the prototype function used to shape the OFDM/OQAM symbols is the IOTA function. Any other OFDM/OQAM function can of course also be used.

FIG. 2 is a block diagram of a sequence for the encoding and transmission of a OFDM/OQAM type prior art multi-carrier signal with real-value symbols.

We consider a source 20 of payload information to be transmitted in the form of an OFDM/OQAM type multi-carrier signal. This payload information consists of binary elements organized in the form of words which are fed into a real QAM (in-quadrature amplitude modulation) modulator 21. The modulation 21 delivers a succession of symbols of a constellation of the QPSK, 16-QAM, 64-QAM, or other type, also called an M-ary signal.

A series-parallel conversion 22 of the M-ary signal makes it possible to obtain N streams 23 of symbols with real values, each having a throughput rate of $1/\tau_0$ symbols per second. By inverse fast Fourier transform (IFFT) 24 and polyphase filtering 25 (herein on the basis of the IOTA prototype function), we obtain N OFDM/OQAM symbols 26 at a throughput rate of $1/\tau_0$ symbols per second.

After parallel-series conversion 27, the multi-carrier signal 28 constituted by OFDM/OQAM symbols with real values can be sent out on one or more antennas (which have not been shown).

As indicated here above, the encoding technique of an embodiment of the invention consists of the addition to the real symbols 26, transmitted in OFDM/OQAM, of supplementary information on their imaginary part in order to turn them into complex symbols. The information conveyed in this imaginary part can be either information independent of the pieces of information conveyed on the real part, or the same information, or again redundancy related to the information conveyed on the real part.

FIG. 3 illustrates the modifications to be made to the transmission sequence of FIG. 2 to achieve this new type of OFDM/OQAM modulation.

We shall now consider two sources of payload information $30_1$ and $30_2$, which may or may not be dependent on each other. Thus, these two sources $30_1$ and $30_2$ may deliver the same binary words. They may also be totally decorrelated from each other, so that there is no relationship between the binary words coming from each of these two sources $30_1$ and $30_2$. Finally, the binary words coming from one of these two sources may correspond to redundancy information from the other source.

As in FIG. 2, the binary words coming from each of the two sources $30_1$ and $30_2$ undergo a real QAM modulation $31_1$ and $31_2$, so as to be converted into symbols with real values of a modulation of a QPSK, 16-QAM, or other type of constellation.

The M-ary signals coming from each of the two modulators $31_1$ and $31_2$ are then weighted, respectively by a real coefficient $\lambda_1$ and by a complex coefficient $i\lambda_2$ (where $\lambda_1$ and $\lambda_2$ are scalar values), then summed 32, in order to form a succession of OQAM symbols with complex values, showing a throughput rate of $N/\tau_0$ symbols per second.

As in FIG. 2, a series-parallel conversion 22 is then performed to obtain N streams 23 of OQAM symbols with complex values, each having a throughput rate of $1/\tau_0$ symbols per second. These N streams 23 undergo an inverse fast Fourier transform IFFT 24, and are then shaped by IOTA polyphase filtering 25, so as to generate OFDM/OQAM symbols 26, at a throughput rate of $1/\tau_0$ symbols per second. After parallel-series conversion 27, we then obtain the OFDM/OQAM type multi-carrier signal 38 with symbols having complex values according to an embodiment of the invention.

Referring to the equation (3), the an embodiment of invention therefore consists in transmitting symbols $\alpha_{m,n}$ with complex values and in modulating them with the prototype functions of the OFDM/OQAM type modulation.

As illustrated in FIG. 3, the power values of the sources $30_1$ and $30_2$ can be adjusted by playing on the value of the real scalar coefficients $\lambda_i$. For example, it is possible to choose to make transmission on the real path of the OFDM/OQAM symbols with a higher power value than that of the imaginary path and then $\lambda_1 > \lambda_2$ is chosen. The path called the real path corresponds here to the phase-shifted real symbols represented in the form of circles and stars in FIG. 1.

It will furthermore be noted that, in the transmission sequence of FIG. 2 as in that of FIG. 3, the sources 20, $30_1$ and $30_2$ may be data encoded by a channel encoding (not shown) designed to introduce redundancy into the signal to be sent. This data can also undergo an interleaving $\Pi$.

In the embodiment of FIG. 3, should the sources $30_1$ and $30_2$ be identical, they are preferably made to undergo a different channel encoding and/or interleaving so as to avoid the sending of exactly the same data on both the real and the imaginary paths of the signal.

An embodiment of the invention can be applied in the context of multi-antenna transmission. Thus, when the OFDM/OQAM signal with symbols having complex values 38 has to be sent out by a transmitter comprising several antennas, the real and imaginary parts of the OFDM/OQAM symbols can be transmitted separately on two distinct sets of antennas. In this way, the inter-symbol interference is averaged so as to improve the performance of a MIMO-OFDM ("Multiple Input Multiple Output") transmission.

Similarly, when the transmitter has several antennas, the STBC ("Space-Time Block Codes") technique (as used in classic OFDM) can also be implemented in the context of an embodiment of the invention.

As indicated here above, the data coming from the two sources $30_1$ and $30_2$ may be either independent or correlated. Here below, referring to FIG. 4, a description is provided of a more particular example of an embodiment of the invention when these two sources are correlated.

Figure 4:
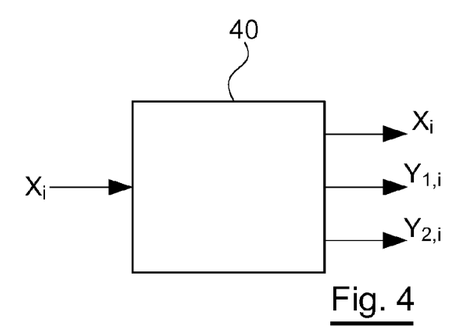
FIG. 4 is an example of implementation of the invention in the context of a ⅓-rate turbo-code.

FIG. 4 illustrates a ⅓-rate turbo-encoder 40 which receives a succession of symbols $X_i$ at input and, at each of its three outputs, delivers sequences $X_i$, $Y_{1,i}$ and $Y_{2,i}$ computed from the input sequence $X_i$.

It is chosen for example to transmit the three outputs of the encoder 40 on the two sources $30_1$ and $30_2$ of FIG. 3, in building the following sequences:

for example, on the first source referenced $30_1$ we transmit the sequence $[X_i\ Y_{1,i}\ X_{i+1}\ Y_{2,i+1}\ X_{i+2}\ Y_{1,i+2}\ X_{i+3} \ldots]$;

for example, on the second source referenced $30_2$ we transmit the sequence $[X_i\ Y_{2,i}\ X_{i+1}\ Y_{1,i+1}\ X_{i+2}\ Y_{2,i+2}\ X_{i+3} \ldots]$.

Advantageously, the pieces of data are then interleaved before modulation and the interleaving of the two sources is independent.

Here below, a description is provided of a detailed example of an embodiment of the invention for a OFDM/OQAM modulation using the IOTA waveform. A simulation has been made on the basis of the following parameters:

Size of the FFT: 512;

Number of modulated carriers: 345

Channel: AWGN;

error correction code: convoluted code with a constraint length K=7 with a rate ½.

The streams on the two paths (real and imaginary) are independent. The coefficients of adjustment of the power values are equal to: $\lambda_1=1$ and $\lambda_2=0.6$. With such a difference, the power ratio between the two paths is 4.4 dB.

In reception, we use an iterative decoding algorithm as described in the related patent application filed on the same date as the present patent application, on behalf of the same applicants and entitled "Method for the iterative decoding of a OFDM/OQAM signal using symbols with complex values, corresponding device and computer program".

Two Offset-QPSK ("Offset Quadrature Phase Shift Keying") constellations are used with ½ rate codes on both the real and the imaginary paths. By way of comparison, a simulation is made of a Offset-16-QAM constellation (solely on the real path) encoded by the same convoluted code and with the same encoding rate which therefore represents the prior art technique in which the OFDM/OQAM symbols have real values.

Figure 7:
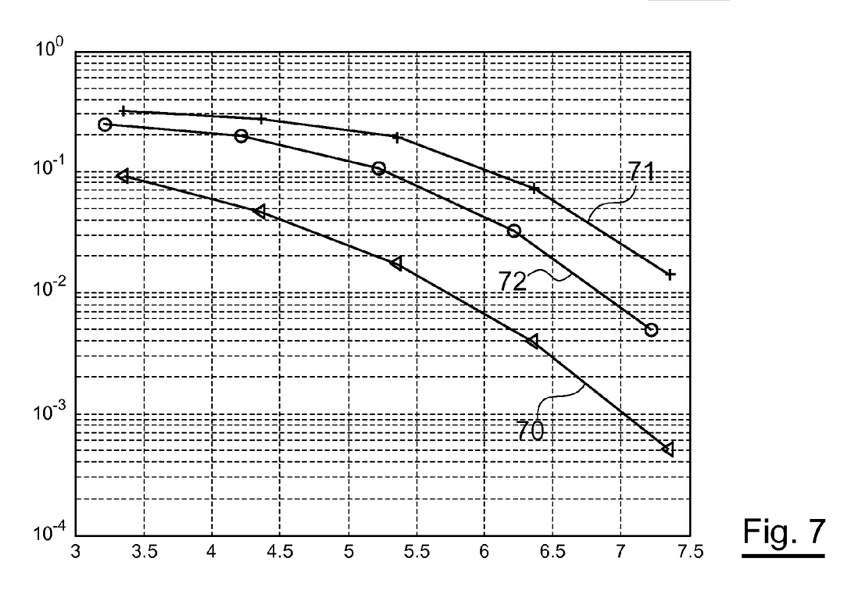
FIG. 7 illustrates the performance of the encoding technique of an embodiment of the invention as compared with the prior art.

The curves of FIG. 7 illustrate the performance of the encoding technique of an embodiment of the invention in the form of a binary error rate, expressed in decibels (dB), as a function of the C/N ratio (Carrier to Noise Ratio).

Even in the simplest possible case in which it is not possible to take advantage of the time-frequency diversity of the channel, when the two paths have the same encoding and are independent of each other, an improvement in performance is observed. Indeed, the difference in binary error rate between the Offset-QPSK on the real path (curve referenced 70) and the Offset-16QAM is about 0.9 dB whereas the difference between this same Offset-16QAM and the Offset-QPSK on the imaginary path (curve reference to 71) is about 0.6 dB.

These results particularly interesting for example for transmission on both paths (real and imaginary) of the data streams that do not necessitate the same error rate at reception. They are also interesting when both paths (real and imaginary) are transmitted to two users associated with transmission channels having different signal-to-noise ratios. The relative power of the two parts can then be adjusted to take account of the difference in quality of the channels of these two users.

Figure 5:
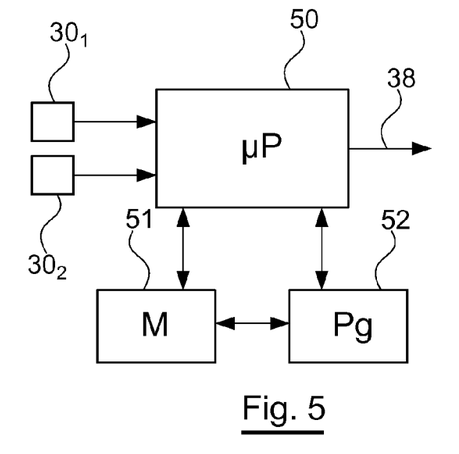
FIGS. 5 and 6 respectively present simplified drawings of the structure of encoding and decoding devices of one or more embodiments of the invention.
Figure 6:
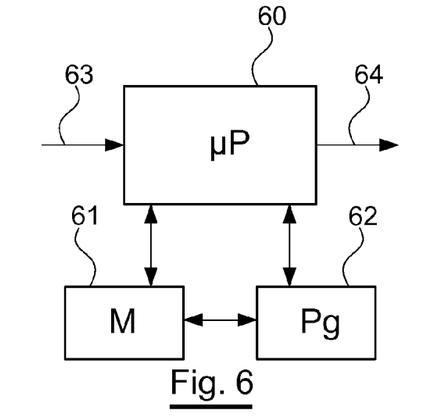

A succinct description is now provided, with reference to FIGS. 5 and 6, of the simplified structure of the encoding and decoding devices of an embodiment of the invention.

The encoding device of FIG. 5 includes a memory M 51, and a processing unit 50 equipped with a processor µP, which is driven by the computer program Pg 52.

At input, the processing unit 50 receives binary words from two sources $30_1$ and $30_2$, which may be independent or correlated. From these successions of binary words, the microprocessor µP, following the instructions of the program Pg 52, builds a OFDM/OQAM type multi-carrier signal for which the complex value symbols are obtained by weighted summing of two constellation symbols with the real values in quadrature obtained by real QAM modulation of the binary words. A construction of this kind by the microprocessor µP also comprises IFFT, polyphase filtering and S/P and P/S conversion operations.

At output of the processing unit 50, an OFDM/OQAM type multi-carrier signal 38 is obtained, the symbols of this signal having complex values.

The decoding device of FIG. 6 for its part has a memory M 61, and processing unit 60 equipped with a processor μP, which is driven by the computer program Pg 62.

At input, the processing unit 60 receives a OFDM/OQAM type multi-carrier signal 63 whose symbols have complex values. This signal has been conveyed by a transmission channel after having been sent as an output from the encoding device of FIG. 5.

Upon reception of the multi-carrier signal 63, the microprocessor μP, following the instructions of the program Pg 52, selects the information associated with one of the real path or imaginary path of the OFDM/OQAM symbols, and then carries out a selective processing of the selected information, so as to deliver an estimation 64 of the source signal associated with this channel. These operations may be performed successively for each of the two channels, or routinely for one of the channels, and possibly for the other channel if the quality of reception of the signal meets a predetermined criterion.

These operations may also be performed iteratively, the microprocessor IP successively selecting each of the two paths, and determining the intrinsic interference generated by the other part to remove it from the received signal and thus refine the estimation of the source signal associated with each of the two paths.

An aspect of the disclosure provides a technique for the encoding of an OFDM/OQAM type multi-carrier signal that improves the performance of a radio link using such a signal.

An aspect of the disclosure provides a technique of this kind that improves the throughput rate of information transmitted by such modulation as compared with prior art OFDM/OQAM modulations or classic OFDM modulations with guard interval. In particular, an aspect of the disclosure doubles or at least significantly increases the number of symbols sent on a transmission channel implementing such a modulation.

An aspect of the disclosure proposes a technique of this kind for improving the binary error rate associated with OFDM/OQAM modulations as compared with the prior art techniques of OFDM/QAM or OFDM/OQAM modulations. In particular, an aspect of the disclosure proposes a technique of this kind that has high spectral efficiency even in using QAM modulation constellations having a small number of states.

An aspect of the disclosure provides a technique of this kind that makes the utmost use of the diversity of the transmission channel implementing such an OFDM/OQAM modulation.

An aspect of the disclosure proposes a technique of this kind that is particularly well suited to multi-antenna (or MIMO) type transmission.

An aspect of the disclosure provides a technique of this kind for the encoding of a OFDM/OQAM type multi-carrier signal that enables high-quality reception of the signal even in the presence of intrinsic inter-symbol or inter-carrier interference.

Although the present disclosure have been described with reference to one or more examples, workers skilled in the art will recognize that changes may be made in form and detail without departing from the spirit and scope of the disclosure and/or the appended claims.

The invention claimed is:

1. Method of encoding an OFDM/OQAM (Orthogonal Frequency Division Multiplexing/Offset Quadrature Amplitude Modulation)-type multi-carrier signal formed by a temporal succession of symbols comprising a set of data elements, each of said data elements modulating a carrier frequency of said signal, the method comprising:

forming each of said data elements by a summing of two real values in quadrature, each corresponding to a binary word of a source signal, modulated according to a predetermined modulation constellation, so as to transmit information on a real path and on an imaginary path of said OFDM/OQAM symbols.

2. Encoding method according to claim 1, wherein said summing is a weighted summing so that one of said paths presents a higher power level.

3. Encoding method according to claim 1, wherein said source signals are correlated.

4. Encoding method according to claim 3, wherein one of said source signals conveys redundancy information related to the payload information conveyed by the other source signal.

5. Encoding method according to claim 3, wherein said source signals are identical but undergo different channel encoding and/or interlacing on each of said paths.

6. Encoding method according to claim 1, wherein said source signals are signals that are independent of each other.

7. Encoding method according to claim 1, wherein the information transmitted on each of said paths comprises, firstly, source information and, secondly, redundancy information computed from said source information.

8. Encoding method according to claim 1, wherein a different protection level is assigned to the information transmitted on each of said paths, said protection level depending on a channel encoding and/or on an order of said predetermined modulation constellation.

9. Device for encoding an OFDM/OQAM (Orthogonal Frequency Division Multiplexing/Offset Quadrature Amplitude Modulation)-type multi-carrier signal formed by a temporal succession of symbols comprising a set of data elements, each of said data elements modulating a carrier frequency of said signal, wherein said device for encoding comprises:

a summing device, which forms each of said data elements by summing two real values in quadrature, each corresponding to a binary word of a source signal, modulated according to a predetermined modulation constellation, so as to transmit information on a real path and on an imaginary path of said OFDM/OQAM symbols.

10. Method for the decoding of a received OFDM/OQAM (Orthogonal Frequency Division Multiplexing/Offset Quadrature Amplitude Modulation) type multi-carrier signal, said signal being formed by a temporal succession of symbols constituted by a set of data elements, each of said data elements modulating a carrier frequency of said signal, wherein, with each of said data elements being formed, at encoding, by summing two real values in quadrature, each corresponding to a binary word of a source signal, modulated according to a predetermined modulation constellation, so as to transmit information on a real path and on an imaginary path of said OFDM/OQAM symbols, said decoding method comprising:

selecting, in said received signal, information associated with a first path from amongst said real path and imaginary path;

selectively processing the information associated with said first path enabling delivery of an estimation of the corresponding source signal;

and, at least at certain instants, selecting, in said received signal, information associated with a second path from amongst said real path and imaginary path;

selectively processing the information associated with said second path enabling delivery of an estimation of the corresponding source signal.

11. A non-transitory computer-readable medium comprising program code instructions recorded thereon, that can be used in a computer, for the implementation of a method of encoding an OFDM/OQAM (Orthogonal Frequency Division Multiplexing/Offset Quadrature Amplitude Modulation)-type multi-carrier signal, the method comprising:
   forming a temporal succession of symbols comprising a set of data elements, each of said data elements modulating a carrier frequency of said signal; and
   forming each of said data elements by a summing of two real values in quadrature, each corresponding to a binary word of a source signal, modulated according to a predetermined modulation constellation, so as to transmit information on a real path and on an imaginary path of said OFDM/OQAM symbols.

12. Device for decoding a received OFDM/OQAM (Orthogonal Frequency Division Multiplexing/Offset Quadrature Amplitude Modulation) type multi-carrier signal, said signal being formed by a temporal succession of symbols constituted by a set of data elements, each of said data elements modulating a carrier frequency of said signal, wherein each of said data elements, being formed, at encoding, by summing of two real values in quadrature, each corresponding to a binary word of a source signal, modulated according to a predetermined modulation constellation, so as to transmit information on a real path and on an imaginary path of said OFDM/OQAM symbols, said decoding device comprises:
   means of selection, in said received signal, of information associated with a first path from amongst said real path and imaginary path;
   means of selective processing of the information associated with said first path enabling delivery of an estimation of the corresponding source signal;
   means of selection, in said received signal, of information associated with a second path from amongst said real path and imaginary path; and
   means of selective processing of the information associated with said second path enabling delivery of an estimation of the corresponding source signal.

13. A method comprising:
   generating, with a device, a multi-carrier signal of the OFDM/OQAM (Orthogonal Frequency Division Multiplexing/Offset Quadrature Amplitude Modulation) type, formed by a temporal succession of symbols constituted by a set of data elements, each of said data elements modulating a carrier frequency of said signal, each of said data elements being formed by summing of two real values in quadrature, each corresponding to a binary word of a source signal, modulated according to a predetermined modulation constellation, so as to transmit information on a real path and on an imaginary path of said OFDM/OQAM symbols, and
   sending the multi-carrier signal.

14. A non-transitory computer-readable medium comprising program code instructions recorded thereon, that can be used in a computer, for implementation of a method of decoding a received OFDM/OQAM (Orthogonal Frequency Division Multiplexing/Offset Quadrature Amplitude Modulation)-type multi-carrier signal, said signal being formed by a temporal succession of symbols constituted by a set of data elements, each of said data elements modulating a carrier frequency of said signal, wherein, with each of said data elements being formed, at encoding, by summing two real values in quadrature, each corresponding to a binary word of a source signal, modulated according to a predetermined modulation constellation, so as to transmit information on a real path and on an imaginary path of said OFDM/OQAM symbols, the method comprising:
   selecting, in said received signal, information associated with a first path from amongst said real path and imaginary path;
   selectively processing the information associated with said first path enabling delivery of an estimation of the corresponding source signal;
   selecting, in said received signal, information associated with a second path from amongst said real path and imaginary path; and
   selectively processing the information associated with said second path enabling delivery of an estimation of the corresponding source signal.

* * * * *